Jan. 8, 1929.  R. M. CRAIG  1,698,259
DENTURE
Filed Feb. 10, 1927
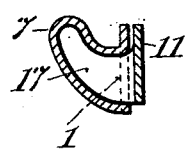
FIG. I.
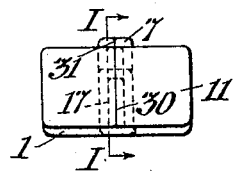
FIG. II.
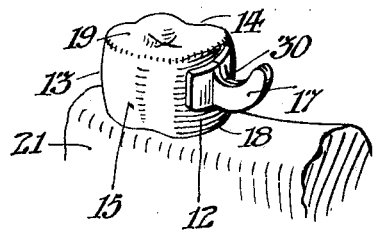
FIG. III.
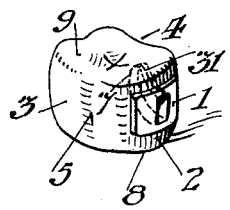
FIG. IV.
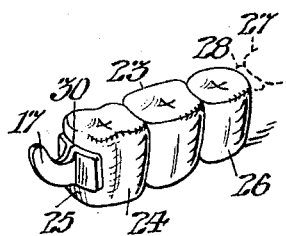
FIG. V.
INVENTOR:
ROBERT MEADE CRAIG, Patented Jan. 8, 1929.

1,698,259

UNITED STATES PATENT OFFICE.

ROBERT MEADE CRAIG, OF WILKINSBURG, PENNSYLVANIA.

DENTURE.

Application filed February 10, 1927. Serial No. 167,090.

My invention is applicable to fixed or removable bridges or plates and provides coupling means for connecting such dentures with natural or artificial teeth fixed in the mouth.

As hereinafter described, my invention includes a pair of metallic complementary female and male coupling members arranged to detachably interlock the side faces of adjoining teeth to which they are respectively secured. As hereinafter described, said coupling includes a female member comprising a flange shaped to fit the side face of a tooth, between the lingual and buccal or labial faces thereof, and having an arcuately curved hollow socket, adapted to extend in such side face of a tooth, near the gingival edge thereof and between the lingual and buccal or labial faces thereof, toward the occlusal face thereof, but terminating short of said occlusal face. The complementary male coupling member includes a flange shaped to fit the side face of a tooth, between the lingual and buccal or labial faces thereof, and having an arcuately curved projection extending outwardly, curved in complementary relation with, and adapted to fit within, said socket; whereby teeth, which are to be held in rigid relation adjoining each other in the mouth, may be respectively provided with said coupling members, independently of each other, and be thus rendered capable of instantaneous coupling in the mouth. For instance, one of said coupling members may be rigidly mounted upon a natural or artificial tooth fixed in the mouth, and the other of said coupling members be mounted upon a tooth which is the end member of a denture, and such denture may be instantly hooked into coupled and substantially rigid relation with the fixed tooth by movement of the denture in a direction corresponding with the arcuate curvature of said complementary coupling members, and said denture may be instantaneously uncoupled by reversal of such curved movement thereof, or may be secured in the mouth by means at the end of the denture opposite to that provided with the coupling member.

I am aware that it is not broadly new to provide natural or artificial tooth bodies with metallic means for connecting them. However, so far as I know, such connecting means are of two types, respectively comprising members which are either parallel with the tooth axis or at right angles thereto, and, in either case, considerable work is required to be done in the mouth to couple such prior dentures, either by soldering or hammering them in the mouth. Moreover, the stresses incident to use of such prior structures tends to dislodge them from the mouth. On the contrary, so far as I am aware, it is broadly new to provide coupling means which may be applied independently to the bodies which are to be coupled and in such manner that the coupling may be instantaneously effected; and particularly to provide coupling means which are arcuately curved so that their connection may be effected by relative arcuate hooking movement thereof and, to thereby effect such connection that stresses incident to use of the denture do not tend to dislodge it from the mouth.

My invention includes the various novel features of construction and arrangement hereinafter more definitely specified.

In said drawings; Fig. I is a sectional view of a pair of coupling members, in coupled position, taken on the line I, I in Fig. II, and in a plane which is between, and parallel with, the lingual and buccal or labial faces of the tooth, and extending from the gingival to the occlusal ends thereof.

Fig. II is an elevation of said coupling members as seen from the right hand side of Fig. I.

Fig. III is a fragmentary perspective view showing a tooth fixed in the mouth and provided with a male coupling member, such as indicated in Fig. I.

Fig. IV is a perspective view of a tooth body provided with a female coupling member such as indicated in Fig. I, and which may be fixed in the mouth.

Fig. V is a perspective view, showing a denture comprising three connected tooth bodies, the side face of an end one of which is provided with a male coupling member such as indicated in Fig. I, and adapted to be coupled with the structure shown in Fig. IV, by an arcuate hooking movement of said denture.

In said figures; the female coupling member, which may be formed of gold or other ductile metal capable of resisting corrosion, comprises the flange 1 shaped to fit the side face 2 of the tooth 3, between the lingual face 4 and the buccal face 5 thereof, and has the arcuately curved hollow socket 7 adapted to extend in that side face 2, near the gingival edge 8 thereof, between said lingual and buccal faces 4 and 5 thereof, toward the occlusal face 9 thereof, but terminating short of said occlusal face, as indicated in Fig. IV.

The male coupling member, which may be formed of such metal as aforesaid, comprises the flange 11 shaped to fit the side face 12 of the tooth 13, between the lingual face 14 thereof and the buccal face 15 thereof, and has the arcuately curved projection 17 extending from that side face 12, near the gingival edge 18 thereof toward the occlusal face 19 thereof, but terminating short of the latter, in complementary relation with and within said socket 7.

Either of said teeth 3 or 13 may be fixed in the jaw 21 and may be either natural or artificial. In either case, the coupling members may be rigidly connected therewith by any suitable means. For instance, the female socket member 7 may be secured in the tooth 3 by cement. The tooth body 13 may be a crown of metal and the male member be secured thereto by solder.

In Fig. V; the denture 23 comprises three tooth bodies, the end one 24 of which has its side surface 25 provided with the male coupling member comprising the projection 17 complementary to the female socket member 7 shown in Fig. IV. It is obvious that said denture 23 may be coupled with the tooth crown 3 by a relative arcuate hooking movement corresponding with the curvature of the members 7 and 17 so as to assemble said members in the position shown in Fig. I. When thus assembled, the stresses upon said denture 23 incident to use, tend to more firmly set it upon the jaw. When thus assembled, said denture 23 may be readily removed by reversal of the arcuate movement thereof by which it was coupled. However, if it is desired to fix said denture 23 in the jaw, the opposite end tooth 26 thereof may be connected with an adjoining tooth 27 in the jaw, by cement 28 or other suitable means.

As indicated in Figs. III and IV; the male coupling may be formed of a stamping of sheet metal which is doubled upon itself to form the projection 17, which is thus divided on the plane indicated by the line 30. However, said projection 17 may be made solid with flanges 11 formed in unitary relation therewith, by a swaging operation. The female socket member 7 may be similarly formed of a pressed sheet metal plate with a dividing line 31 intermediate of the width of the socket 7 at the top thereof, as indicated in Figs. II and IV, or such female coupling members may be formed by a drawing operation upon sheet metal or by casting or drop forging operations.

It is to be particularly noted that each of the complementary arcuately curved male and female members aforesaid, exemplified at 7 and 17 in Fig. I extends so as to lie between the lingual and buccal and occlusal faces of the teeth, as indicated in Figs. IV and V; so that the natural occlusal faces of the teeth in which said members extend are left intact to not only withstand the stresses of chewing therewith, but said members are thus covered and concealed by such occlusal faces of the teeth so that the latter thus present a more natural appearance than if the metal parts were presented at the occlusal surfaces.

Therefore, I do not desire to limit myself to the precise details of construction and arrangement herein set forth, as it is obvious that various modifications may be made therein without departing from the essential features of my invention, as defined in the appended claims.

I claim:

1. In a denture, a metallic female coupling member, comprising a flange shaped to fit the side face of a tooth, between the lingual and buccal faces thereof, and having an arcuately curved hollow socket, adapted to extend inwardly from that side face, near the gingival edge thereof, between the lingual and buccal faces thereof, toward the occlusal face thereof, but terminating short of said occlusal face; whereby said occlusal face remains intact and covers and conceals said coupling member.

2. In a denture, a metallic male coupling member, comprising a flange shaped to fit the side face of a tooth, between the lingual and buccal faces thereof, and having an arcuately curved projection adapted to extend outwardly from that side face, near the gingival edge thereof, between the lingual and buccal faces thereof, toward the occlusal face of an adjoining tooth, but terminating short of such occlusal face; whereby said occlusal face remains intact.

3. In a denture, a coupling for adjoining teeth, arranged to detachably interlock the adjoining side faces thereof, including a metallic female socket member arcuately curved inwardly from the side face of one tooth, and a metallic male member arcuately curved outwardly, from the side face of the other tooth, from the gingival edge toward the occlusal face thereof but terminating short of said occlusal face; whereby said occlusal face remains intact and covers and conceals said coupling member and said members may be coupled and uncoupled by relative arcuate movement thereof.

4. In a denture, the combination with two adjoining teeth; of a coupling for said teeth, arranged to detachably interlock the adjoining side faces thereof, including a metallic female socket in one tooth, opening at one side face thereof and arcuately curved inwardly from that face, between the buccal and lingual faces of that tooth, from the gingival edge toward the occlusal face thereof, but terminating short of said occlusal face; and a metallic male coupling member complementary to said female member, including a projection extending from the adjoining side face of the other of said teeth, within said female socket; whereby each of said teeth may be provided with its coupling member, independently of the other, with its occlusal face remaining intact and rendered capable of instantaneous coupling in the mouth.

5. In a denture, a coupling for adjoining teeth, comprising complementary male and female members which are similarly arcuately curved in relation to a common axis of their relative movement and fitted one within the other; whereby said members may be coupled and uncoupled only by relative arcuate movement thereof.

6. A denture coupling member, formed of metal, comprising a flange shaped to fit the side face of a tooth, between the lingual and buccal faces thereof and covered and concealed by the occlusal face thereof, and having a hollow arcuately curved member extending transversely thereto.

7. A denture coupling member, formed of metal, comprising a flange shaped to fit the side face of a tooth, between the occlusal lingual, and buccal faces thereof, and having an arcuately curved member extending transversely thereto; said curved member being fitted for arcuately movable relation with another and oppositely counterpart coupling member.

In testimony whereof, I have hereunto signed my name at Wilkinsburg, Pennsylvania, this 20th day of January 1927.

ROBERT MEADE CRAIG.